United States Patent [19]

Potters

[11] Patent Number: 4,543,690
[45] Date of Patent: Oct. 1, 1985

[54] APPARATUS FOR FORMING FIBER FELTS

[75] Inventor: Michel Potters, Pays Bas, France

[73] Assignee: Isover Saint-Gobain, Courbevoie, France

[21] Appl. No.: 601,482

[22] Filed: Apr. 18, 1984

[30] Foreign Application Priority Data

Apr. 20, 1983 [FR] France .................. 8306431

[51] Int. Cl.$^4$ .............................. D01G 25/00
[52] U.S. Cl. ........................ 19/300; 19/304; 28/289
[58] Field of Search .............. 19/300, 296, 299, 304, 19/305, 306, 148; 28/289

[56] References Cited

U.S. PATENT DOCUMENTS

| 2,845,661 | 8/1958 | Svende et al. | 19/304 |
| 3,134,145 | 5/1964 | Miller | 19/299 X |
| 3,256,569 | 6/1966 | Draving | 19/300 |
| 3,903,570 | 9/1975 | Rowe | 19/300 |

Primary Examiner—Henry S. Jaudon
Assistant Examiner—Judith L. Kravitz
Attorney, Agent, or Firm—Oblon, Fisher, Spivak, McClelland & Maier

[57] ABSTRACT

An apparatus as disclosed for controlling the distribution of fibers in a fiber felt forming process, which comprises a guide duct through which a gas current with felt fibers entrained is directed. The gas passes through a perforated conveyor, which retains the fibers.

The duct is caused to oscillate by a connecting rod affixed to the guide duct and a rotary element by universal joints at either end, connection being effected by cardans, by which the rotary element entrains the connecting rod in its rotary movement. By moving the axis of rotation of the rotary element away from the center of the guide duct/connecting rod joint, an oscillating movement is imparted to the guide duct. The entire apparatus, including a motor for inducing rotary movement may be caused to undergo translational movement by a pair of opposed hydraulic jacks, the operation of which may alter the median direction of the movement of the oscillating guide duct.

The apparatus as disclosed provides for automated movement and correction during operation of the device, providing better control over the distribution of fibers.

3 Claims, 4 Drawing Figures

APPARATUS FOR FORMING FIBER FELTS

BACKGROUND OF THE INVENTION

1. Field of the Invention

The invention relates to improvements in techniques for forming felts, particularly thick felts sucn as those intended for heat and sound insulation.

2. Background of the Prior Art

Conventionally, the formation of felts from fibers carried by a stream of gas is carried out by passing this gaseous current through a perforated receiving conveyor which retains the fibers. To fix the fibers, a binder is sprayed onto the fibers during the course of their trajectory towards the receiving conveyor. This binder is then hardened, for example, by a heat treatment.

This technique is used particularly in the production of mineral fiber felts. Due to the importance of this type of production, we will refer hereinafter to the formation of fibers of glass materials. Nevertheless, the improvements according to the invention can be applied to all felt-making methods, whether the fibers are mineral or organic.

One of the difficulties encountered in the preparation of these felts is connected with the uniform distribution of fibers over the whole of the felt. The current of gas carrying the fibers ordinarily has a limited cross-section which is a function in particular of the fiber-producing apparatus. Also, the current of gas does not normally manage to cover the entire width of the conveyor and the fibers are not uniformly d1stributed as a result.

Various means have been proposed in order to improve the distribution of fibers on the conveyor. Among these means, one of the most useful in practice is of the type described in U.S. Pat. No. 3,134,145. This consists of passing the flow of gas carrying the fibers through a guide duct. This duct is mobile and an oscillatory movement is imparted to it in order alternately to direct the flow of gas from one edge to the other of the fiber-receiving conveyor.

By this means, if the conditions of use are suitably chosen, the fibers become deposited over the full width of the conveyor.

In prior art techniques which employ an oscillating duct, as in U.S. Pat. No. 3,134,145, the movement is communicated by a connecting rod fixed on the one end to the duct and on the other to a crank or a disc to which a rotary movement is imparted according to an axis at right-angles to the axis of the connecting rod.

These prior art apparatuses furthermore comprise mechanical regulating means, for example means for regulating the length of the connecting rod, generally via the point of attachment of the connecting rod on the crank or disc, which make it possible respectively to determine the median direction and the amplitude of the oscillations communicated to the duct. Although these devices do on the whole function in a satisfactory manner, adjusting them while they are working is delicate insofar as such adjustment has to be carried out on moving mechanisms. The method of regulation proposed in these devices does not lend itself to automation.

The object of the invention is to provide an improved technique for the distribution of fibers in the felts produced.

It is a particular object of the invention to allow the distribution to be modified during the course of operation.

Another object of the invention is to ensure that modification of the distribution of fibers is carried out automatically according to variations in the distribution of fibers measured continuously on the felts produced.

SUMMARY OF THE INVENTION

According to the invention, these objects are achieved by means of a new apparatus for imparting movement to the guide duct.

According to this new apparatus, the guide duct has movement imparted to it by a connecting rod, the movement of which is not situated in one plane as in the case of prior apparatus. This connecting rod is fixed at each of its ends by a universal joint, on the one end to the guide duct and on the other to an elemenr to which a rotary movement is imparted. The axis of rotation of this element passes through the center of the articulation fixed on the duct when an oscillatory movement is not being imparted to the latter. Displacement of this axis from the position brings about an oscillatory movement, the amplitude of the oscillations being all the greater the more remote its axis from the center of the articulation.

Whatever may be the direction of movement of the axis of rotation, the result is an oscillating movement. For reasons of simplicity, displacement of the axis of rotation corresponds preferably to a tilting of the motor assembly which generates the rotation.

DETAILED DESCRIPTION OF THE INVENTION

Figure 1:
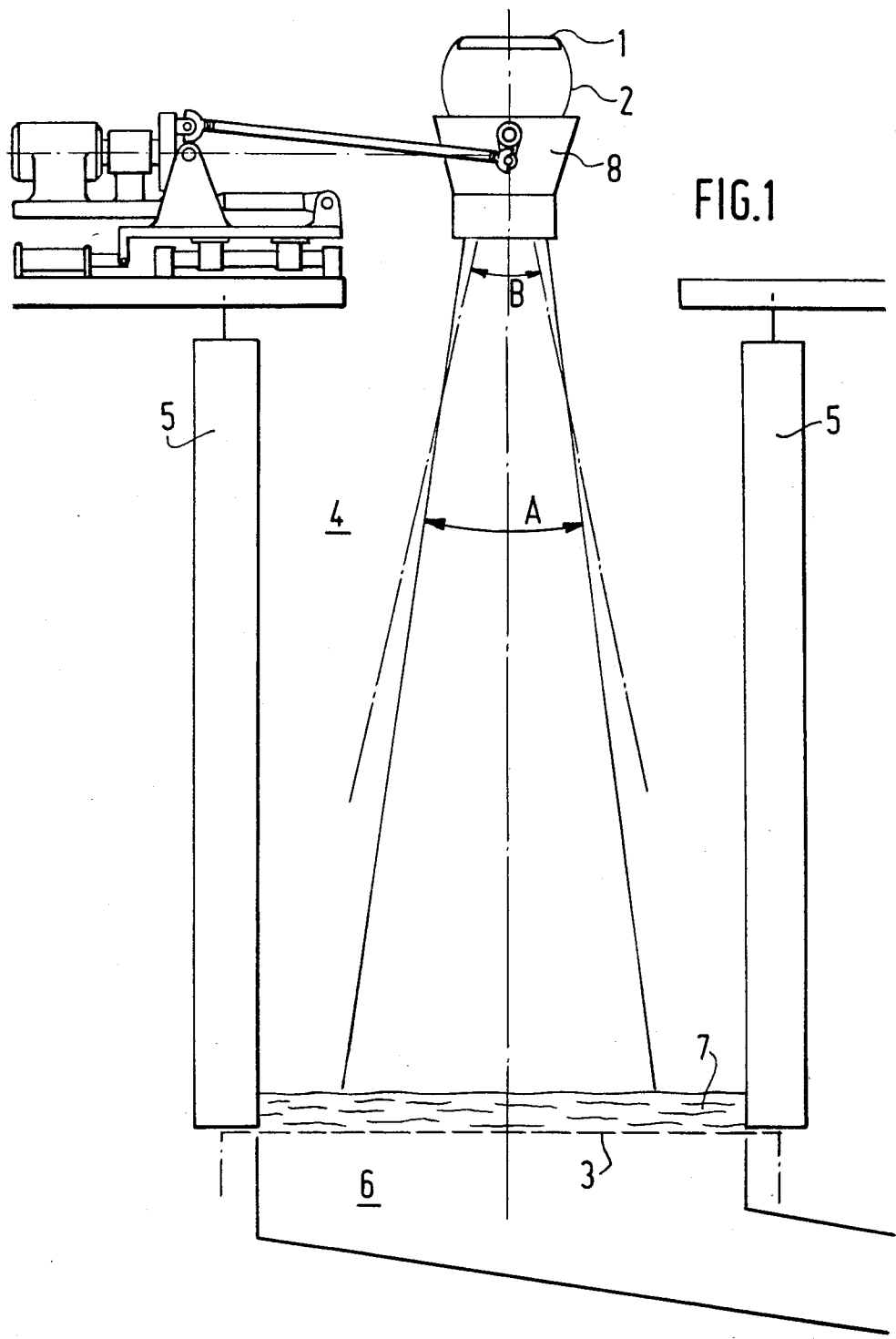
FIG. 1 is a diagrammatic view of a plant for forming fiber felts, viewed transversely in relation to the direction of progress of the receiving conveyor.

The felt-forming plant in FIG. 1 comprises an apparatus for forming fibers, a receiving assembly and distribution means.

In this drawing the forming device is of the type in which the material to be fiberized is projected in the form of fine filaments out of a centrifuge in which there is a multitude of orifices. The filaments are then entrained and drawn out by a current of gas which is directed vertically downwardly. Ordinarily, the current of gas is at a high temperature which makes it possible to maintain the filaments in conditions which are propitious for drawing.

The fibers entrained by the current of gas form a kind of annular veil 2 around and below the centrifuge 1.

This manner of forming fibers has been the subject of numerous publications. For a detailed description of the working conditions and of the apparatus, reference may in particular be made to French Pat. No. 78 34616.

Of course, the invention is not confined to a particular manner of forming fibers. On the contrary, it embraces all techniques in which a felt of fibers is made up from fibers carried by a current of gas. The example of forming fibers by this centrifugal technique has been chosen only because it enjoys considerable importance at industrial level.

In this type of formation, the film of fibers closes up again under the centrifuge for reasons linked with the geometry of the fibering apparatus. Then, on contacr with the ambient atmosphere, the current of gas carrying the fibers expands.

The expansion of the current of gas is an entirely general phenomenon which is independent of the form of the current at its origin and therefore independent of the manner employed for forming the fibers.

The current of gas carrying the fibers is directed into an enclosure 4, the base of which is constituted by a perforated conveyor 3. This enclosure is closed laterally so that the current of gas cannot be evacuated otherwise than by passing through the perforated conveyor 3.

Laterally, walls 5 channel the flow of gas. As shown in FIG. 1, the walls may be movable. These walls have the advantage that they can be continuously cleared of fibers which may cling to them undesirably, which is likely if the fibers have had a binder composition sprayed onto them while they are passing in the direction of the conveyor. The spraying assembly is not shown.

Observation of the current of gas carrying the fibers reveals that it expands relatively slowly. In the case in question, the current of gas adopts a conical shape, the angle of opening A of which is of the order of some 20 degrees. The felts prepared very often have a width of over 2 m and at its origin the current is relatively narrow and it will be appreciated that it is not possible to obtain a sufficiently wide flow to cover all the surface of the conveyor. This is shown in FIG. 1.

Under the conveyor belt 3, the gas is passed into the chamber 6 which is kept at negative pressure in relation to the enclosure 4, by extraction means not shown.

The container 6 is so disposed that suction is applied over the full width of the conveyor 3. Thus it is possible to avoid the formation of undesirable turbulence in the enclosure 4. To a certain extent, the uniform suction likewise encourages a regular distribution of the fibers, the zones of the conveyor which are already loaded with fibers offering greater resistance to the passage of gases, so opposing the accumulation of additional fibers.

Nevertheless, the balance which tends to become established on the conveyor by the presence of the fibers themselves is not sufficient to achieve a suitable distribution over a conveyor, the width of which is much greater than that of the current of gas. The accumulation of fibers is greater in the center of the conveyor, that is to say in the direct path of the current of gas.

In order to improve the distribution of fibers, an oscillating guide duct 8 is disposed in the path of the current of gas. The current is channelled through the duct 8, the size of which is such that tilting it diverts the currenr, compelling it to sweep over the full widtn of the conveyor 3.

The guide duct 8 is placed in the upper part of the enclosure 4, as far as possible from the conveyor so that changes in direction which have to be imparted to the current of gas are as small as possible. Furthermore, it is preferable to channel the current of gas while its geometry is well-defined, that is to say as close as possible to the fiber-forming device.

Figure 2:
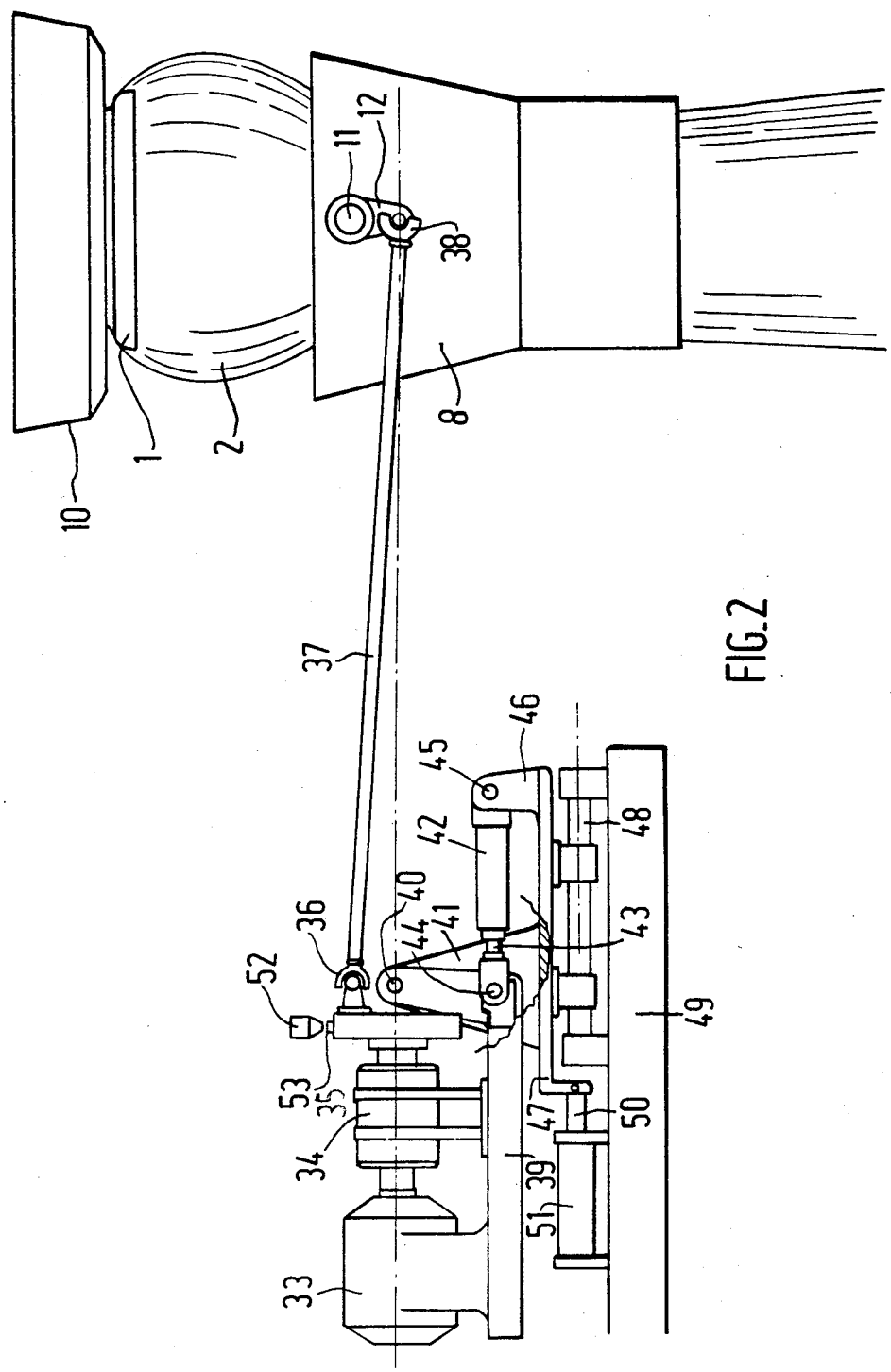
FIG. 2 is a partial enlarged view of FIG. 1 showing more precisely the constitution of the fiber distributing apparatus.

FIG. 2 shows in greater detail the guide duct 8 and the mechanism which propels it, in an arrangement according to the invention.

In FIG. 2, the guide duct has in its upper part a slightly flared frustoconical shape which widens out in the direction of the fiber-forming device. This flared shape facilitates channelling of the drawing gases emitted by an annular drawing means 10 at the periphery of the centrifuge 1.

The duct 8 is supported by two pivots 11 engaged on bearings fixed on uprights, not shown. The axis of rotation is set relatively high on the duct to minimize the disposition of the opening of the duct.

The movement is generated by a motor assembly which, in the example illustrated, consists of a variable speed motor 33. Movement is imparted to a reduction gear 34 then to the disc 35.

A universal joint 36 is mounted on this disc so that it can pivot freely according to its axis. A bearing box not shown disposed in the disc 35 ensures freedom of rotation of the cardan shaft on the disc 35.

A connecting rod 37 is fixed by one of its ends to the cardan 36 while its other end is fixed to a second cardan 38. The cardan 38 is likewise fixed to an arm 12 rigidly connected to the guide duct 8.

The motor assembly is mounted on a platform 39 which is free to pivot about an axis 40 carried by bearings in supports 41 disposed on either side of the platform.

In FIG. 2, the front support has been left out for greater clarity.

The position of the platform 39 and therefore of the motor assembly which it carries is regulated by a hydraulic jack 42, of which the rod 43 is articulated on an axis 44 rigidly connected to platform 39. The jack 42 is itself mounted to pivot on an axis 45 carried by bearings situated on uprights 46 rigidly connected to a carriage 47.

The carriage 47 is adapted for translational movement. It is fixed on slide rods 48. The slide rods are fixed on the frame 49.

The end of the rod 50 of a hydraulic jack 51 rigid with the frame 49 is fixed to the carriage 47.

The assembly functions in the following way:

The motor 33 imparts a rotary movement of the disc 35 through the speed reduction device 34. In its rotation, the disc 35 entrains the cardan 36 and the corresponding end of the connecting rod 37.

When the center of the cardan 36 is situated on the rotary axis, no movement is communicated to the duct 8 which remains immobile. If the axis of the motor system is displaced in relation to this position of rest, eacn rotation of the disc 35 corresponds to an alternating movement.

Figure 3A:
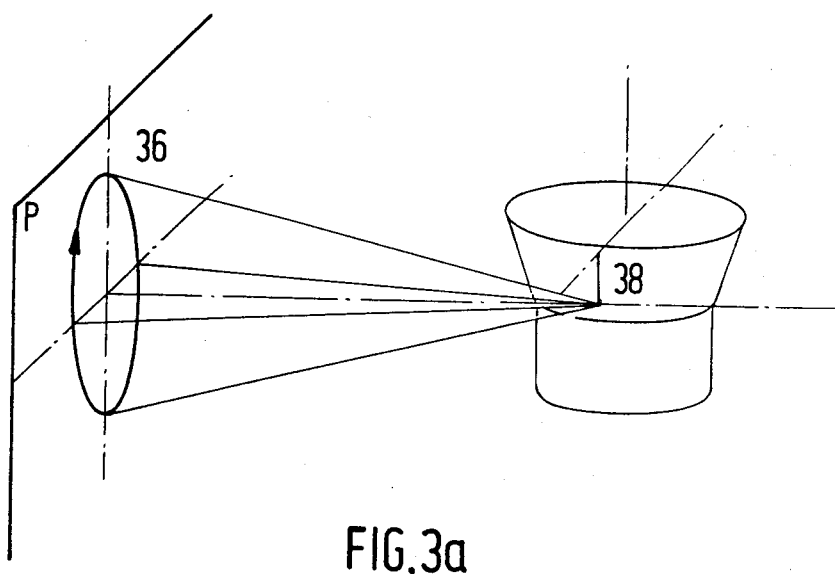
FIGS. 3a and 3B are diagrams showing the mode of operation of the device which propels the guide ducts.
Figure 3B:
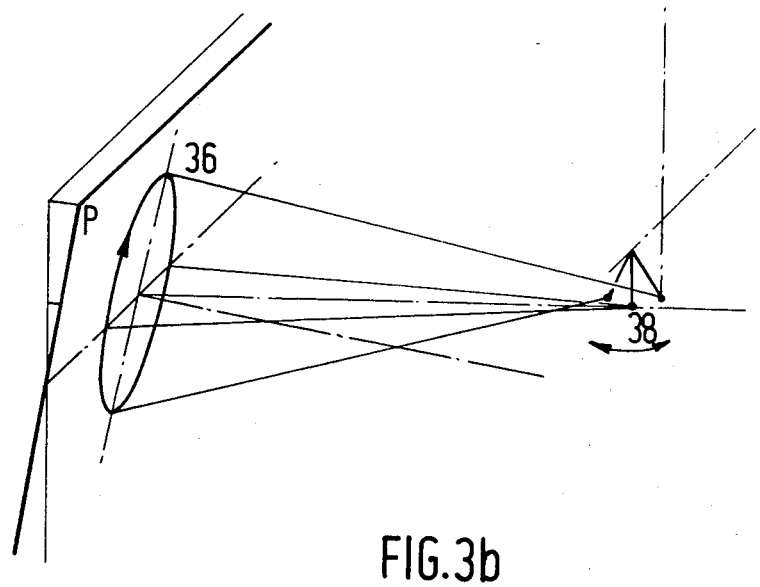

The diagrams in FIGS. 3a and 3b show the principle of this movement. The center of the cardan 36 describes a circle in a plane P. When the center of the cardan 38 is on the axis of rotation (FIG. 3a), it remains immobile. All positions of the cardan 36 are equidistant from the point of "rest" of the cardan 38. When this same plane is inclined and therefore when the axis of rotation is moving away from the point of rest of the center of the cardan 38, rotation of the cardan 36 brings about a reciprocating movement, the amplitude of which is a function of the spacing between the axis of rotation and the center of the cardan 38 (see FIG. 3b).

In the embodiment illustrated, displacement of the axis of rotation is brought about by tilting the plane in which the cardan 36 is moving. By ensuring that the axis of tilt of the plane passes through the center of the circle described by the cardan 36, an alternating movement is obtained on the guide duct 8 which is substantially symmetrical on either side of the position of rest without having to modify further parameters. This arrangement is therefore preferred.

Tilting of the plane P is obtained by turning the platform 39 about the axis 40. To achieve almost symmetrical displacement of which mention has been made hereinabove, the axis 40 is so disposed that it encounters the axis of rotation of the motor assembly 33, reduction unit 34, disc 35, the meeting point being located in the center of the circle described by the cardan joint 36.

Otner arrangements are possible but necessarily result in asymmetry of the oscillating movement of the duct 8 in relation to the position of rest.

Displacement of the platform 39 by means of the jack 42 obviously only takes place when a modification of the oscillatory movement of the duct 8 is undertaken. The greater or less inclination of the platform 39 is translated by modification of the amplitude of oscillations of the guide duct 8. The greater the inclination, the greater is the amplitude of the oscillating movement.

For reasons of simplicity in the embodiment illustrated, tilting is performed about a horizontal axis 40 but other positions of the axis would be equally suitable in order to engender this oscillating movement, in particular a vertical position.

Amplitude being determined in such a way as indicated, it is also possible to modify the median direction of the duct 8 in this oscillating movement. To this end, the motor assembly, including the platform 39, the supports 41, the jack 42 and the uprights 46 are mounted on the carriage 47.

Movement of the rod 50 of the jack 51 displaces the carriage 47 along guide rods 48. This displacement brings about a similar displacement of the center of the cardan joint 36.

Translation of the carriage 47 is preferably performed in a direction which is substantially parallel with the axis of rotation of the disc 35 in the position of rest. Under these conditions, a translational movement of the carriage does not, for practical purposes, alter the amplitude of the oscillations of the guide duct 8. In other words, in the preferred arrangement shown in FIG. 2, modifications of amplitude and of median direction of the oscillatory movement can be regulated independently of each other.

It is evident that by reason of this device, modifications of the oscillations of the duct 8 can be undertaken during the course of operation. It is also clear that regulation by means of jacks 42 and 51 permits of all desirable combinations.

The regulating jacks may be replaced by equivalent means, particularly by screw systems associated with electric motors, or by any other means which makes it possible to impart a continuous movement which can be maintained in a fixed position.

This manner of regulating the amplitude and the median direction also permits of quite extensive automation to the extent that the jacks (or equivalent means) can be controlled by a regulating assembly as a function of measurements which are themselves taken continuously and automatically.

The frequency of oscillations can also be modified by varying the running of the variable motor 33.

In felt production plants, normally several machines are aligned. The fibers produced by each machine are superposed in successive layers in the same felt. The distribution of the fibers in each layer is important to the overall distribution.

As a function of the speed of travel of the receiving conveyor, the frequency of the oscillations and the geometry of the plant, it may be necessary to proceed in such a way that the various guide ducts of each machine are in phase or, on the contrary, are constantly dephased one in relation to the others.

To allow regulation of the phases, a detector 52. makes it possible to reference the position of the wheel 35 (for example by an inductive proximity contact with a stud 53 placed on the wheel), or more exactly that of the cardan 36 in its rotary movement. The signals emitted by the detectors which determine the position of each disc 35 are sent to an electronic assembly in which they are compared with phase references selected by the operator. As a function of the divergence found in relation to the phase references, so the assembly automatically generates a reply in the direction of the variable motor 33 which, by instantly accelerating or slowing down, makes it possible to establish the selected degree of phase shift.

The construction and dimensions of the mechanical transmission are chosen in such a way that tilting of the guide duct 8 can meet all practical requirements. In other words, the limits of movement shown for example in FIG. 1 in the form of one angle B formed by the axis of the duct in the extreme positions, are such that the current of gas would go beyond the width of the conveyor if it were not to strike the lateral walls 5.

The distributing means used according to the invention lends itself to frequent corrections of the mode of distribution such as may appear to be necessary in the production of felts.

Indeed, the dispersron of the fibers on the conveyor, whatever precautions may be taken, is subject to a number of risks. One can understand that it is very difficult perfectly to maintain a stable flow of gases inside the enclosure 4. In addition to the current carrying fibers, considerable induced currents develop. Furthermore, in one and the same enclosure there are normally several fiber-forming devices, the currents of gas of which cannot fail to have an effect on one another. Consequently and notwithstanding the vacuum effect which is established under the conveyor, the enclosure 4 is the focal point of considerable turbulence. To these causes of irregularity may be added an accidental lack of uniformity in vacuum applied.

Whatever the reasons may be, experience shows that during the course of operation, irregularities in the transverse distribution of fibers appear which are maintained for relatively long periods so that it is desirable to modify the working conditions of the guide duct in order to seek to restore greater uniformity.

Another advantage of using means according to the invention in order to actuate the guide duct is to permit of automated control. Indeed, the variations mentioned hereinabove occur without pattern. It is therefore very desirable for corrections to be possible as soon as a fault in distribution is detected.

In order to achieve such control, the device according to the invention for the distribution of fibers is associated with an assembly for measuring the distribution and with calculating means.

The product manufactured is analyzed for example by an X-ray absorption assembly. The result of these measurements is sent to computing means which also receive data in respect of the parameters which determine operation of the distribution system: frequency, amplitudes and median direction of the movements of the guide duct, speed of the conveyor. According to the data submitted to memory, so the computing means process replies which, by modifying the parameters in question, seek to correct the distribution faults found.

The replies generated take into account the respective influence of the various parameters of movement of the guide duct on the distribution of fibers in the felt. Generally speaking, responses are pre-established in that they take account of the following considerations.

The frequency must be sufficient for all the surface of the moving conveyor to be effectively covered by the fiber-bearing stream. Where several fiber-forming apparatuses are used to produce one felt, it is not always indispensable for each of them fully to cover the flow. It is sufficient for the overall effect of the devices actually ro correspond to complete coverage.

It is not advantageous to excessively increase frequency. The improvement which can be obtained from this is not very great and one of the drawbacks is the inertia of the fiber film. Beyond a certain frequency, it is found that movement of the current of gas no longer manages to follow that which is imposed upon it at the guide duct. Therefore, effective regulation of distribution of fibers becomes impossible.

It is possible to provide for frequency regulation, for example according to what is a previously determined optimum for eacn mass per unit of surface area. Regulation of frequency can then be carried out in conjunction with regulation of the speed of passage of the conveyor according to the mean mass per unit of surface area measured over the entire width of the felt.

The amplitude and the median direction of the movement of the guide duct directly determine the transverse distribution of the fibers. The use of guide ducts in traditional constructions made it possible to show simple results as to the manner in which these parameters affect distribution. Modification of the median direction, while the amplitude remains constant, brings about a displacement or depositing of fibers in the same direction as this modification. Taking into account the presence of the lateral walls, this displacement is translated into fact by a growth in the mass of fibers per unit of surface area of the side towards which displacement is taking place. Likewise, it is found that an increase in the amplitude of movement favors the deposition of fibers on the edges of the conveyor to the detriment of the center and vice versa.

Measurements of fiber mass per unit of surface area and processing such measurements by computer means have as their object particularly the best possible control of these parameters.

Implementation of the invention described hereinabove significantly enhances the improvement of fiber distribution in the felts formed.

The facility and accuracy of regulation of movement of oscillation is an important factor in this improvement. Automation of the control set is another important factor.

Thanks to these means of distribution and their automation, according to the invention it is possible to obtain wide felts (of 2 m or more) for which the variation of mass per unit of surface area is less than 5% over the whole width of the felt.

The invention has been described above with regard to specific embodiments and examples. In particular, mechanical connecting means, drive means and automation means have been particularly identified. variations of these and other aspects of the invention will occur to those of skill in the art without the exercise of inventive faculty, and remain within the scope of the invention as claimed below.

What is claimed as new and desired to be secured by Letters Patent of the United States is:

1. An apparatus for the formation of a fiber felt, comprising:

means for generating a gas current in which fibers are entrained, said gas current being directed into a receiving enclosure comprised of a perforated conveyor which retains said fibers but allows said gas to pass therethrough, a mobile guide duct through which said gas current passes prior to said receiving enclosure, which guide duct may be caused to oscillate, in a movement which may be modified in frequency, amplitude and median direction during operation of the apparatus, means for inducing and modifying said oscillation, said means further comprising a connecting rod fixed to and connecting said guide duct with an element exhibiting a rotary movement, the connection to said guide duct being effected by a universal joint to a cardan rigidly affixed to said guide duct, the connection to said element exhibiting rotary movement also being effected through a universal joint to a cardan in such fashion that the cardan is entrained in said rotary motion, said oscillation movement and modification being effected by moving the axis of said rotary movement away from or toward the center of the joint of said connecting rod with said guide duct, wherein said element exhibiting rotary movement, and a motor for inducing said movement are supported on a platform which is adapted for rotary movement about an axis and also longitudinal movement relative to said guide duct, said platform being connected to hydraulic jack means capable of displacing said platform.

2. The apparatus of claim 1, wherein said motor is a variable speed motor, allowing variation of the speed of rotary movement and therefore the frequency of oscillation.

3. The apparatus of claim 1, further comprising a plurality of said devices.

* * * * *